United States Patent [19]
Wolf et al.

[11] 3,896,576
[45] July 29, 1975

[54] DENTAL X-RAY FILM AND CHART VIEWING APPARATUS

[76] Inventors: Hugo M. Wolf, 1451 N.E. Glacier Ln., Minneapolis, Minn. 55421; Leo H. Wolf, 2000 Idaho Ave. So., Minneapolis, Minn. 55426

[22] Filed: Aug. 1, 1973

[21] Appl. No.: 384,466

[52] U.S. Cl. .................. 40/106.1; 211/89; 248/282
[51] Int. Cl.² ........................................ G09F 13/10
[58] Field of Search .................. 40/106.1, 67, 341; 248/282, 283, 281, 486; 211/89, 96, 102; 240/2 AT, 2 AD

[56] References Cited
UNITED STATES PATENTS

| | | | |
|---|---|---|---|
| 1,096,448 | 5/1914 | Murphey et al. | 248/282 X |
| 1,110,973 | 9/1914 | Tischler | 248/282 X |
| 2,611,981 | 9/1952 | Whitebread | 40/128 X |
| 2,760,288 | 8/1956 | Shoenfeld | 40/106.1 |
| 3,168,954 | 2/1965 | Von Herrmann | 211/89 X |
| 3,215,482 | 11/1965 | Litke | 248/282 X |

FOREIGN PATENTS OR APPLICATIONS

| | | | |
|---|---|---|---|
| 581,088 | 10/1946 | United Kingdom | 40/106.1 |
| 1,308,004 | 9/1962 | France | 40/106.1 |

Primary Examiner—Robert W. Michell
Assistant Examiner—John F. Pitrelli

[57] ABSTRACT

A dental X-ray film viewer having a rectangular frame carrying an opaque sheet and electric lamps operable to provide light to the sheet to visually display the X-ray film. A holder mount on a lower part of the frame is operable to releasably carry a dental chart. An elongated arm supports the frame for movement about two separate upright axes whereby both the viewer and chart holder can be moved to a location where both the X-ray film and chart can be conveniently and simultaneously read by a dentist working on a patient.

11 Claims, 5 Drawing Figures

PATENTED JUL 29 1975 3,896,576

DENTAL X-RAY FILM AND CHART VIEWING APPARATUS

SUMMARY OF INVENTION

The invention is broadly related to an apparatus for visually displaying information. More particularly, the invention is related to an apparatus for simultaneously illuminating an X-ray film and supporting printed chart information, such as a dental chart. The apparatus has a viewing means providing a light background for viewing information on transparent media. The transparent media is held on the viewing means with clip means. Holding means mounted on a bottom portion of the viewing means is operable to releasably hold a printed information sheet member, as a dental chart. The viewing means is movably attached to a stationary member with a support means comprising an elongated arm means. First means pivotally mounts the arm means on the viewing means and a second means pivotally mounts the arm means on the stationary member whereby the viewing means can be separately moved about separate upright pivotal axes.

An object of the invention is to provide an illuminating viewer for transparent media, as an X-ray film, which can be moved about separate upright axes from a stored position to a convenient viewing or working position. A further object of the invention is to provide a viewer for illuminating transparent media and removably holding printed information so that both the viewing media and printed information can be simultaneously examined.

Figure 1:
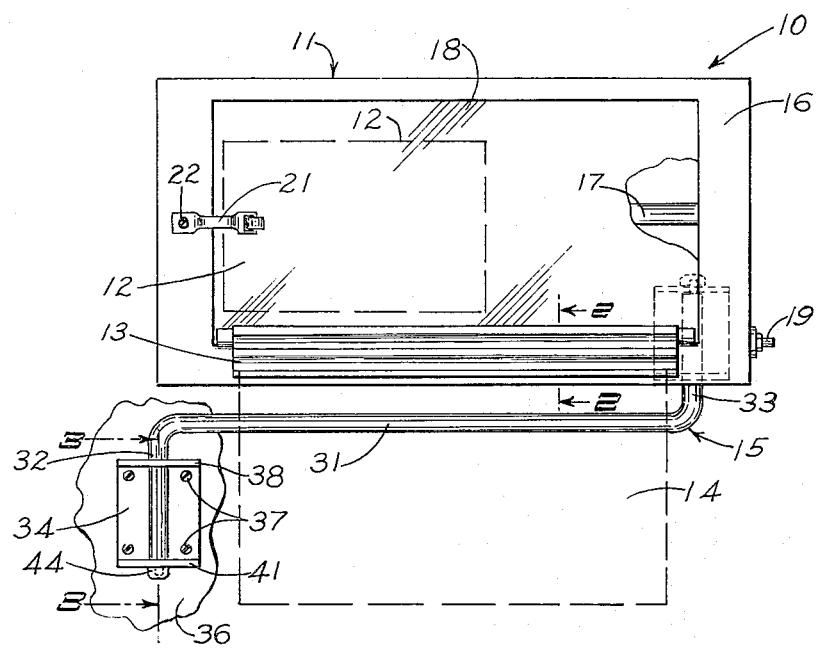
FIG. 1 is a front elevational view of the information display apparatus of the invention.

Referring to the drawings, there is shown in FIG. 1 the information display apparatus or viewer indicated generally at 10 movably mounted on a support 36, as a cabinet, wall or like stationary structure. The display apparatus is useable as a dental treatment room accessory to display X-ray charts or dental charts. The support 36 can be the wall behind the doctor's sink cabinet, as disclosed in our U.S. patent application Ser. No. 292,478, filed Apr. 3, 1972. The subject matter of application Ser. No. 292,478 is incorporated herein by reference.

The information display apparatus comprises a viewer indicated generally at 11 for supporting a transparent information means 12, as an X-ray film. An elongated holder indicated generally at 13 is mounted on the lower portion of the viewer and removably supports an information chart or sheet member 14, such as a dental chart. A support means indicated generally at 15 movably mounts the viewer on the support 36 in a manner whereby the viewer can be moved toward and away from the support and rotated about a generally upright position permitting the chart to be moved toward or away from the patient to a convenient viewing position to the operator. The viewer and associated holder enable the operator to read the X-ray film and dental chart at the same time.

Viewer 11 has a generally elongated rectangular frame 16 carrying an illumination or light source 17, as one or more horizontal lights or lamps. Source 17 can be fluorescent bulbs extended generally horizontally across the frame. Suitable bulb holders (not shown) are mounted on the sides of the frame to mount the illumination source. The rectangular front opening of the frame is covered with a light transparent wall or sheet member 18, as a glass or plastic member. The power to the light source 17 is controlled by a manually operated switch 19 mounted on one side of frame 16. The electrical power cord 20 enters the bottom of the frame adjacent switch 19.

The transparent information means 12 is held on the member 18 with a spring finger or clip 21. A fastener, as a screw, 22 attaches one end of the clip 21 to the side of frame 16. Clip 21 is a spring finger which is biased into engagement with the member 18.

Figure 2:
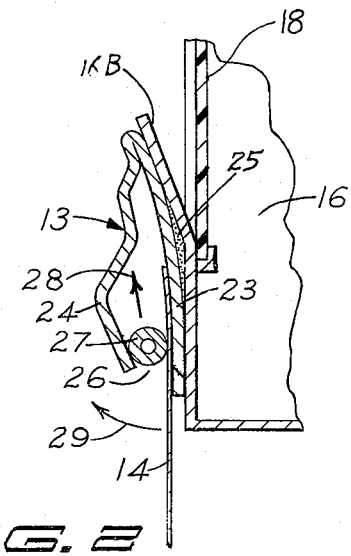
FIG. 2 is an enlarged sectional view taken along the line 2—2 of FIG. 1.

Referring to FIG. 2, the holder 13 has a back member or base plate 23 and a front member or plate 24 spaced from and angularly inclined with respect to the back member 23. The upper part 16B of frame 16 is inclined outwardly away from member 18. The lower edge of information means 12 can be located in the V-groove between part 23A and member 18. An elongated foam tape 25 having a double faced adhesive secures the back member 23 to the lower part of frame 16. As shown in FIG. 1, holder 13 extends in a generally horizontal direction substantially the entire width of the member 18. The space between the members 23 and 24 leads to an elongated linear mouth 26 which permits the upper edge of chart member 14 to be moved into holder 13. The chart member 14 is releasably held in the holder with a plurality of linear rollers 27 located in the mouth 26. The rollers move down and supply a holding or clamping action on the sheet member 14. Pulling the sheet member in a straight downward direction will increase the holding or squeezing action of the rollers so that the sheet member does not fall out of the holder.

The sheet member 14 is removed from the holder by pulling the bottom portion of the sheet member in a forward direction, as indicated by arrow 29. This curls the upper portion of the sheet member and forces the rollers 27 in an upward direction, as indicated by arrow 28 in FIG. 2. This releases the holding or squeezing action of the rollers on the sheet member. An example of the holder is shown in U.S. Pat. No. 3,168,954.

Figure 3:
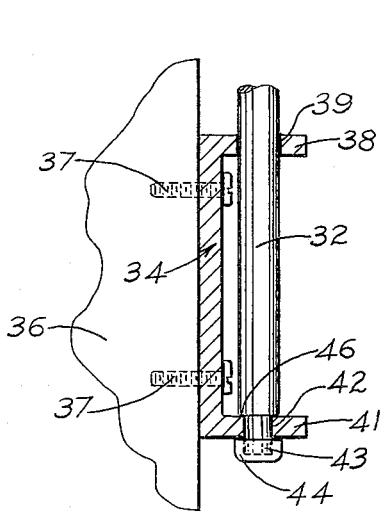
FIG. 3 is an enlarged sectional view taken along the line 3—3 of FIG. 1.

The support means 15 comprises a generally horizontal arm 31 having a first downwardly directed end 32 and a second upwardly directed end 33. A support bracket or wall bracket 34 is secured to the support 36 with a plurality of fasteners 37, such as screws, bolts or the like. Bracket 34 has an upper, outwardly directed flange 38 having a generally central hole 39. Projected outwardly from the lower edge of the bracket 34 is a lower flange 41 having a hole 42 vertically aligned with hole 39. As shown in FIG. 3, the end 32 projects downwardly through hole 39 and terminates in a projection 43 extended through hole 42. A push nut 44 is mounted on the end of projection 43 that extends through hole 42. Projection 43 has a diameter smaller than the diameter of the end 32 and has an annular shoulder 46. Shoulder 46 bears against the upper surface of flange 41, thereby providing a thrust bearing surface for the rod end 32. The end 32 is rotatably mounted on the flanges 38 and 41 for movement about a generally upright or vertical axis. The axis extends generally parallel to the surface of the upright support 36, as shown in FIGS. 1 and 2.

Figure 4:
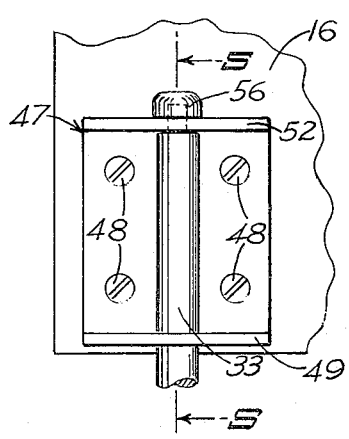
FIG. 4 is a fragmentary rear elevational view of the information display apparatus showing the arm mount.
Figure 5:
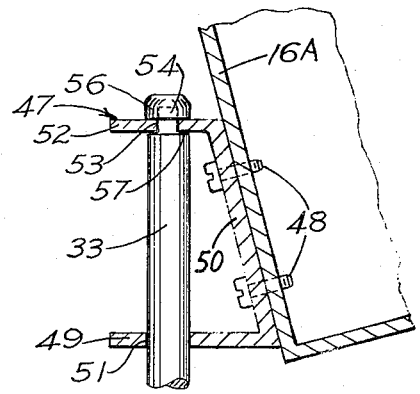
FIG. 5 is a sectional view taken along the line 5—5 of FIG. 4.

Referring to FIGS. 4 and 5, there is shown a bracket indicated generally at 47 attached to the back of frame 16 with a plurality of fasteners 48, as bolts, screws and the like. Bracket 47 has an outwardly directed horizontal lower flange 49 having a hole 51 for accommodating rod end 33. Extended outwardly from the upper end of bracket 47 is an upper flange 52 having a hole 53 axially aligned with hole 51. Flange 49 is longer than flange 52. Both flanges 49 and 52 are secured to an inclined back 50 attached with fasteners 48 to back 16A of the frame 16. This locates the viewer 11 in an upwardly and rearwardly inclined position. Viewer 11 has a slope of about 15° relative to a vertical plane. The rod end has an upwardly directed projection 54 extended through hole 53. A push nut 56 is mounted on the portion of projection 54 that extends through hole 53. Projection 54 has a diameter smaller than the diameter of the rod end 33, forming an annular shoulder 57. The annular shoulder is in bearing engagement with the lower surface of the flange 53, thereby supporting the bracket as well as the viewer on the rod end 33. The bracket 47 is rotatably mounted on rod end 33 for movement about a generally upright or vertical axis. The axis of movement of the bracket 47 is generally parallel to the axis of rotation of rod end 32.

The following is an example of a particlar information display apparatus, it being understood that the information display apparatus of the invention can utilize other types of viewers and supporting arms. The viewer 11 has a viewing area enclosed with a light transparent wall or sheet of a size 5½ × 13 inches. The sheet 18 is carried in a rectangular plastic box. The light source 17 comprises a single flourescent lamp. The support arm 31 has a length of 15½ inches with a first downwardly directed end of 3½ and a second upwardly directed end of 3½ inches. The arm 31 is a solid metal member which can be chrome plated. Holder 13 follows the configuration of the holder shown in FIG. 2 of U.S. Pat. No. 3,168,954.

In use, the bracket 34 is mounted on the support 36 with fasteners 37. The rod 31 is mounted on bracket 34 by inserting rod end 32 through aligned holes 39 and 42, as shown in FIG. 3. The push nut retains the rod end 32 in assembled relation with the bracket 34. The shoulder 46 rests on the upper side of flange 41 and thereby supports the rod end 32 on the bracket 34. The opposite end of the rod 31 is rotatably mounted in bracket 47. As shown in FIG. 5, the rod end 33 projects through hole 51 in flange 49 and projection 54 extends through hole 53 in flange 52. A push nut holds bracket 47 in pivoting relation with the rod end 33. The upper flange 52 of the bracket bears on the annular shoulder 57. The bracket 47 is secured to the lower back corner of the viewer 11. This permits rotation of the viewer about an upright axis adjacent one end of the viewer. The opposite end of rod 31 is located in general alignment with the opposite end, or left end as shown in FIG. 1, of the viewer. This permits the rotation of both the viewer and arm about a second upright axis. In other words, the viewer is selectively rotatable about two generally upright axes. One of the axes is located adjacent a first end of the viewer. The other of the axes is located adjacent or second end of the viewer.

Transparent means, as an X-ray film, is placed against the member 18 and retained there with spring clip 21. The dental chart is moved up through mouth 26 of the holder. The rollers 27 hold the chart in assembled relation with the holder. The viewer is illuminated by actuation of switch 19. This provides a light background for the transparent information means.

The operator or dentist can move the viewer toward the operating area where it can be readily viewed by the operator and his assistant. When the need for observation of the viewer and dental chart is no longer required, the viewer and chart can be moved back adjacent the support where it does not interfere with the operating procedure or personnel traffic flow in the dental treatment room.

The embodiments of the invention in which an exclusive property or privelge is claimed are defined as follows:

1. An apparatus for displaying information located on transparent media and a sheet member comprising: viewer means providing a light background for viewing information on transparent media, said viewer means having a generally rectangular frame having a lower section, a light transparent sheet member having an outside surface located on a front side of the frame, light source means within the frame providing a light background behind the sheet member, means for holding the transparent media adjacent the outside front surface of the sheet member whereby the information on said media can be visually inspected, holder means attached to the front of the lower portion of the frame for holding a sheet member in substantially co-planar relationship with said transparent media and in position for concurrent visual inspection of the information on the transparent media and sheet member, said holder means comprising a member having a back member extending horizontally along and attached to the lower portion of the viewer means and a front member connected to the back member, said front member inclined downwardly toward the back member, and roller means located between the front member and the back member to hold the sheet member, and support means movably mounting the viewer means on a stationary member, said support means comprising an elongated generally horizontal arm, said arm having a first downwardly directed end at one end thereof and a second upwardly directed end at the other end thereof, first bracket means pivotally mounting said first end on a support for movement about a first generally upright axis, and second bracket means secured to one end of said frame and pivotally accommodating said second upright end of the arm for rotating the viewing means about a second generally upright axis, said second upright axis being generally parallel to said first upright axis.

2. The apparatus of claim 1 wherein: each end of the arm means has shoulder means for vertically supporting the viewer means on the first means and second means.

3. The apparatus of claim 1 wherein: the first means includes a generally U-shaped member having vertically aligned holes for accommodating a portion of the arm means.

4. The apparatus of claim 1 wherein: the second means includes a generally U-shaped member having vertically aligned holes for accommodating a portion of the arm means.

5. The apparatus of claim 1 wherein: the first means includes a bracket secured to the viewer means, said bracket having means holding the viewer means in an upwardly and rearwardly inclined position.

6. An apparatus for visually displaying information located on transparent media and a sheet member comprising: viewing means providing a light background for viewing information on a transparent media, said viewing means including a generally rectangular frame, light transparent sheet means mounted on one side of said frame, said frame having a horizontal lower section including an upwardly and outwardly directed horizontal flange providing a horizontal groove for accommodating the lower edge of the transparent media, and an illumination source located behind said sheet means providing said light background, clip means mounted on said frame for holding the transparent media on the sheet member, holder means mounted on the front of said lower section of the frame for holding a printed information sheet member in substantially co-planar relationship with said transparent media and in position for concurrent visual inspection of the information on the transparent media and sheet member, and support means movably mounting the viewing means on a stationary member, said support means comprising an elongated generally horizontal arm, said arm having a first downwardly directed end at one end thereof and a second upwardly directed end at the other end thereof, first bracket means pivotally mounting said first end on a support for movement about a first generally upright axis, and second bracket means secured to one end of said frame and pivotally accommodating said second upright end of the arm for rotating the viewing means about a second generally upright axis, said second upright axis being generally parallel to said first upright axis.

7. The apparatus of claim 6 wherein: said first end of the arm and said second end of the arm each have shoulder means engageable with a portion of the bracket means for vertically supporting the arm on said bracket means.

8. The apparatus of claim 6 wherein: the first bracket means and the second bracket means each comprise a generally U-shaped member having vertically aligned holes for accommodating the end portions of the rod.

9. The apparatus of claim 6 wherein: said holding means for retaining the information sheet member includes a generally linear member having a back portion secured to the lower portion of the rectangular frame and a front portion connected to the back portion, said front portion being inclined downwardly toward the back member and spaced therefrom, and roller means located between the front portion and the back portion to releasably hold a portion of the sheet member between said front portion and back portion.

10. The apparatus of claim 6 wherein: the second bracket has means holding the viewing means in an upwardly and rearwardly inclined position.

11. The apparatus of claim 10 wherein: the means holding the viewing means includes a U-shaped member having an upwardly and rearwardly positioned back secured to the frame of the viewing means.

* * * * *

UNITED STATES PATENT AND TRADEMARK OFFICE
CERTIFICATE OF CORRECTION

PATENT NO. : 3,896,576
DATED : July 29, 1975
INVENTOR(S) : HUGO M. WOLF ET AL

It is certified that error appears in the above–identified patent and that said Letters Patent are hereby corrected as shown below:

Column 3, line 41, "3-1/2" should be --3-1/2 inches--.

Signed and Sealed this seventh Day of October 1975

[SEAL]

Attest:

RUTH C. MASON
*Attesting Officer*

C. MARSHALL DANN
*Commissioner of Patents and Trademarks*